United States Patent
Smith

[15] 3,661,333
[45] May 9, 1972

[54] TREE DESTROYER
[72] Inventor: Leward N. Smith, Remus, Mich.
[73] Assignee: Morbark Industries, Inc., Winn, Mich.
[22] Filed: Jan. 22, 1971
[21] Appl. No.: 108,933

[52] U.S. Cl. ..................241/281, 241/101 M, 144/162 R, 144/176, 144/242 R
[51] Int. Cl. ..................................B02c 18/06, B27l 11/02
[58] Field of Search..................144/162, 176, 3 D, 242; 241/281

[56] References Cited

UNITED STATES PATENTS

| | | | |
|---|---|---|---|
| 2,936,008 | 5/1960 | Brown | 144/162 R |
| 3,545,692 | 12/1970 | Burkett | 241/281 |
| 2,847,045 | 8/1958 | Brown | 144/162 R |
| 3,394,744 | 7/1968 | Vit | 144/162 R X |
| 3,285,305 | 11/1966 | Nicholson | 144/3 D |
| 3,275,049 | 9/1966 | Gunn | 144/176 |

*Primary Examiner*—Donald R. Schran
*Attorney*—Learman & McCulloch

[57] ABSTRACT

Tree destroying apparatus for reducing felled trees directly to chips comprising a log chipper for cutting the trunks and branches into chips, and apparatus for feeding the trees forwardly, trunk-first, toward the chipper, entrance opening including a tree supporting feed bed with a power driven conveyor, a generally laterally extending endlessly driven member above the feed bed cooperating with the conveyor to form a tree feeding drive nip, and upstanding laterally spaced limb and branch folding members positioned on opposite sides of the conveyor for folding the tree branches laterally toward the tree trunk.

44 Claims, 4 Drawing Figures

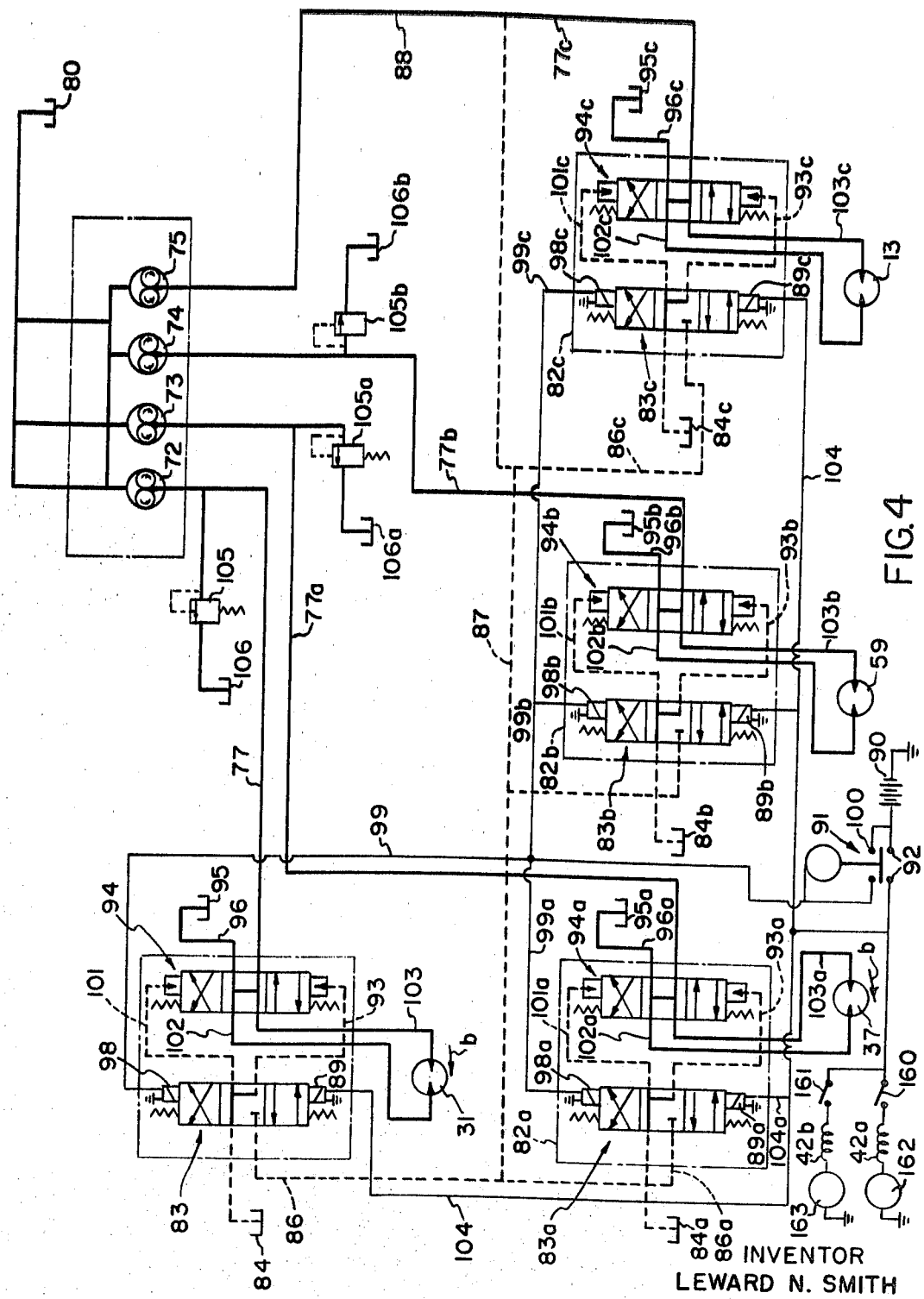

3,661,333

TREE DESTROYER

FIELD OF THE INVENTION

This invention relates to apparatus for reducing whole, felled trees to chips and more particularly, to new and novel apparatus for pressing the tree branches to the tree trunks prior to cutting the trees into chips.

BACKGROUND OF THE INVENTION

Brush and trees, which are too small to be processed for lumber or are not suited to pulping operations, are frequently cut and destroyed because they are located in the path of planned construction or because they are diseased. In the past, the removal and destruction of such trees has been expensive and time-consuming. Burning is one method used in the past to destroy such trees, however, because of the strict anti-pollution restrictions now existing in many states, this method of destruction generally is no longer feasible.

Due to recent technological advancements, wood chips which include bark can now be used in the construction of "flake-board," "particle-board," and other similar products used in the felt and roofing industry. Apparatus constructed according to the present invention is provided for cutting the bark laden trees to chips after crushing or folding the branches to the trunk of the tree. The apparatus is particularly well adapted for handling trees having branches which are broken off during transit but which are held by the other tree branches, trees having crooked trunks, and trees and brush having leafy type foliage. The apparatus is constructed so as to avoid the "long chute" effect and prevents the branches from springing back after they are once folded toward the trunk. More particularly, apparatus constructed according to the present invention includes a feed assembly which is adapted to convey a felled tree, butt end first, toward a chipping unit disposed in the path of the moving tree. A power driven upper roll cooperates with a conveyor for conveying a tree forwardly toward the chipping unit and folding the branches vertically inwardly toward the tree trunk. A pair of upstanding side rolls are positioned to form a throat for engaging the tree branches laterally inwardly of the ends of the drive roll to fold the branches laterally toward the tree trunk. The upper roll and conveyor provide a gripping nip which grips vertically opposite sides of the tree and permits the tree to swing slightly, if it needs to, into alignment with the chipper chute.

The present invention may more readily be described by reference to the accompanying drawings in which:

FIG. 4 is a schematic diagram of a combined electrical and hydraulic control and drive system for controlling the apparatus illustrated in FIGS. 1 – 3.

THE GENERAL DESCRIPTION

Figure 3:
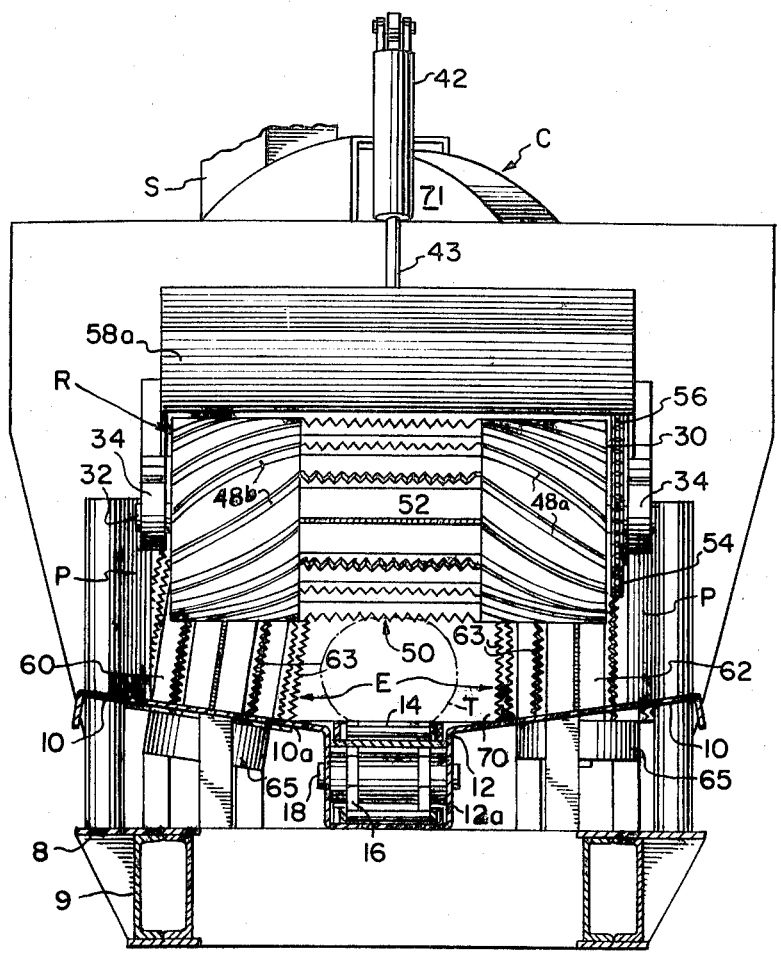
FIG. 3 is a sectional, rear end view, taken along the line 3—3 of FIG. 2.

Apparatus constructed according to the present invention includes a tree delivering conveyor, generally designated D, for conveying whole, felled trees, schematically illustrated at T and having their respective branches B and trunks K intact, toward a log chipping unit C, which cuts the trees into small chips. The tree delivering conveyor D is mounted on a mobile frame F which includes a trailer bed 8 (FIG. 3) supported on suitable ground-engaging wheels (not shown) by longitudinally extending frame rails 9. A vertically movable, power driven, upper, drive roll R is supported above the tree delivering conveyor D to aid in moving the tree T toward the chipper C and to compress the tree branches B vertically toward the trunk of the tree as it moves toward the chipping unit C. In addition, a pair of upstanding side rolls E are provided forwardly of the drive roll R for compressing the tree limbs or branches laterally inwardly toward the trunk of the tree as it is being moved toward the chipping unit C.

THE TREE DELIVERING CONVEYOR

Figure 2:
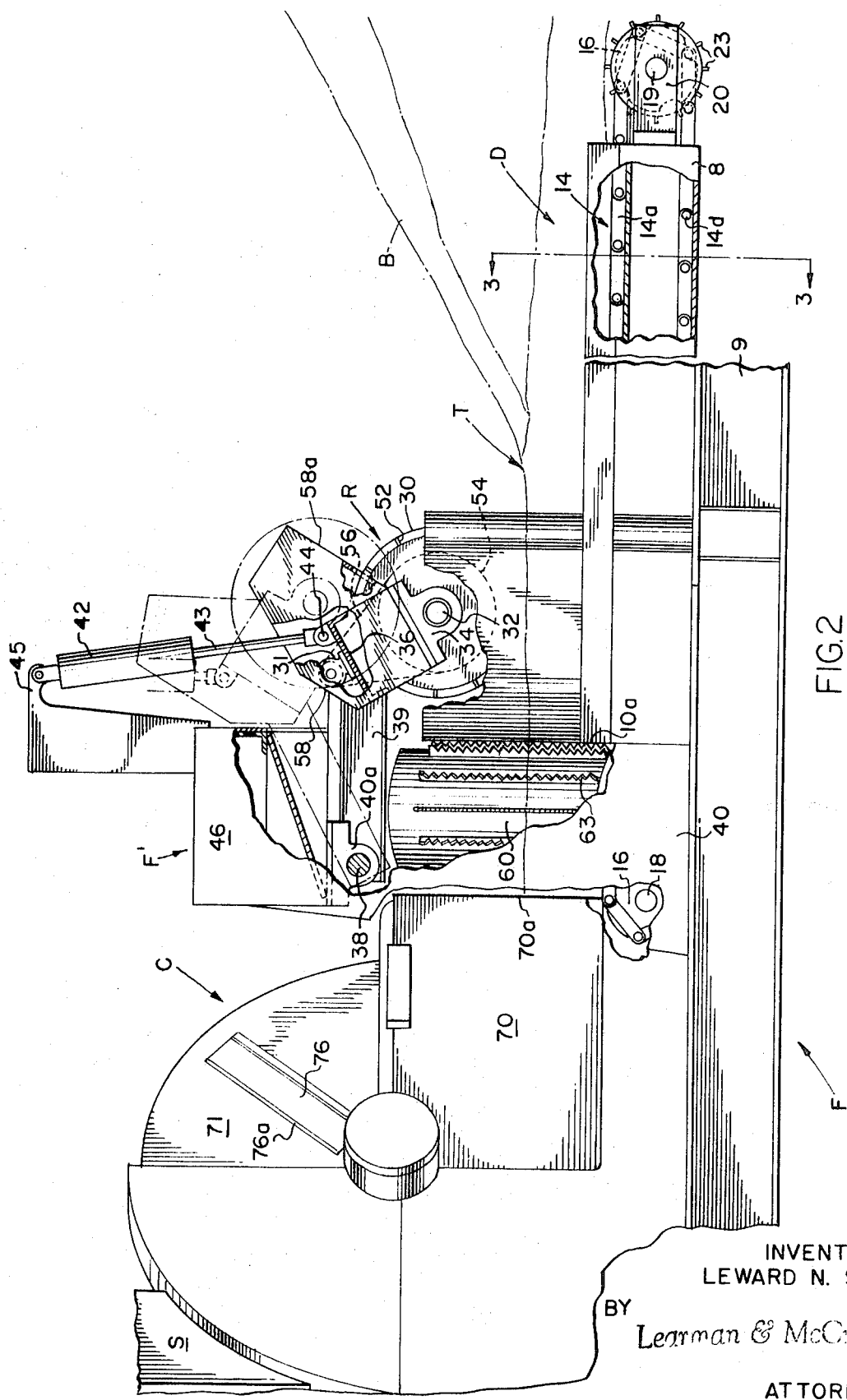
FIG. 2 is a side elevational view of the apparatus illustrated in FIG. 1, parts being broken away to more clearly illustrate other portions thereof.

The tree delivering conveyor D constitutes a "live deck" and includes a pair of tree supporting platforms 10 (FIG. 3), which are slightly vertically inclined in opposite directions and are positioned on opposite sides of a conveyor receiving trough portion 12 in which an endless conveyor chain 14 is disposed. The conveyor chain 14, which includes a plurality of interconnected, U-shaped chain links 14a, having side plates 14b spanned by tree supporting shafts 14c, is trained around front and rear sprocket wheels 16 (FIG. 2). Pins 14d pivotally connect the links 14a.

The front sprocket wheel 16 is fixed to a shaft 18 journaled by the sides 12a of the trough 12, while the sprocket wheel 16 at the rear end of the deck D is fixed to a shaft 19 journaled by a pair of bearing blocks 20 mounted rearwardly of the platforms 10. A hydraulically operated drive motor 13 (FIG. 4) includes an output shaft (not shown) drivingly connected with the front shaft 18. On opposite sides of the rear sprocket wheel 16, and fixed to the shaft 19, is a pair of horizontal rollers or drive wheels 22 for assisting in advancing the branches of longer trees T forwardly in the direction of the arrow a (FIG. 1) toward the chipper C. The rollers 22 each include a plurality of circumferentially spaced apart serrated ribs 23 forming comb-like teeth which engage a tree supported on the "live deck" D to aid in propelling it forwardly. The sloped decks 10 cooperate with the rollers 22 to tend to centralize the trunk and move the limbs laterally inwardly as the tree is fed forwardly toward the chipper C.

THE UPPER ROLL

The roll R comprises a cylindrical drum 30 fixed to a shaft 32 which is supported, at opposite ends, on a pivotal subframe F' by a pair of bearing blocks 34. The subframe F' includes a transversely extending beam 36 (FIG. 2), mounting the blocks 34, and arms 39 which are pivotally mounted on a shaft 38. The shaft 38 is journaled in bearings 40a provided on upstanding support posts 40 (FIG. 3) fixed to opposite sides of the main frame F. The drive roll R is vertically moved between the solid line position (FIG. 2) and the chain line position (FIG. 2) by a double acting, solenoid actuated, hydraulic cylinder 42, pivoted on an overhanging bracket 45 fixed to a frame supported member 46 and including a piston rod 43 pivotally connected to the transverse beam member 36 by a pivot pin 44.

The drum 30 includes groups of oppositely pitched flights 48a and 48b on opposite ends thereof for gathering and laterally centrally directing the branches on laterally opposite sides of a tree T, supported on the deck D, inwardly toward the trunk of the tree, as the tree T is moved forwardly toward the chipping unit C. The mid-section 50 of the drum 30 is provided with a plurality of circumferentially spaced serrated or toothed ribs 52, providing comb-like teeth which engage the tree from above. The drum 30 and the conveyor D form a nip into which the tree branches B are vertically compressed or crushed, and the tree trunk is gripped, to cooperatively drive the tree, butt end first, forwardly in the direction of the arrow a, toward the chipping unit C.

For driving the drum 30, a sprocket wheel 54 (FIG. 1) is fixed to the sprocket wheel supporting shaft 32, and a chain 56 is trained around the sprocket wheel 54 and another sprocket wheel (not shown) that is driven by the output shaft of a hydraulically operated rotary motor 31 (FIG. 4) supported on the transverse beam 36. A motor guard housing 58 for the hydraulic motor 31 is fixed to the transverse beam member 36.

It should be noted that the axis of the shaft 38 is forward or downstream of the roll R so that the area rearwardly or upstream of the roll R is clear of obstructions to minimize the possibility of tree branches becoming entangled with the roll supporting mechanism. It should also be noted that the forward wall 58a of the housing 58 is inclined downwardly toward the drum 30 so that any branches which engage the face 58a will be deflected downwardly toward the drum 30, as they are moved forwardly by the conveyor chain 14. When the tree branches which are deflected by wall 58a engage the flights 48 and ribs 50 on the drum 30, they are driven downwardly and clockwisely in FIG. 2 toward the trunk of the tree on the conveyor chain 14.

THE SIDE ROLLERS

Figure 1:
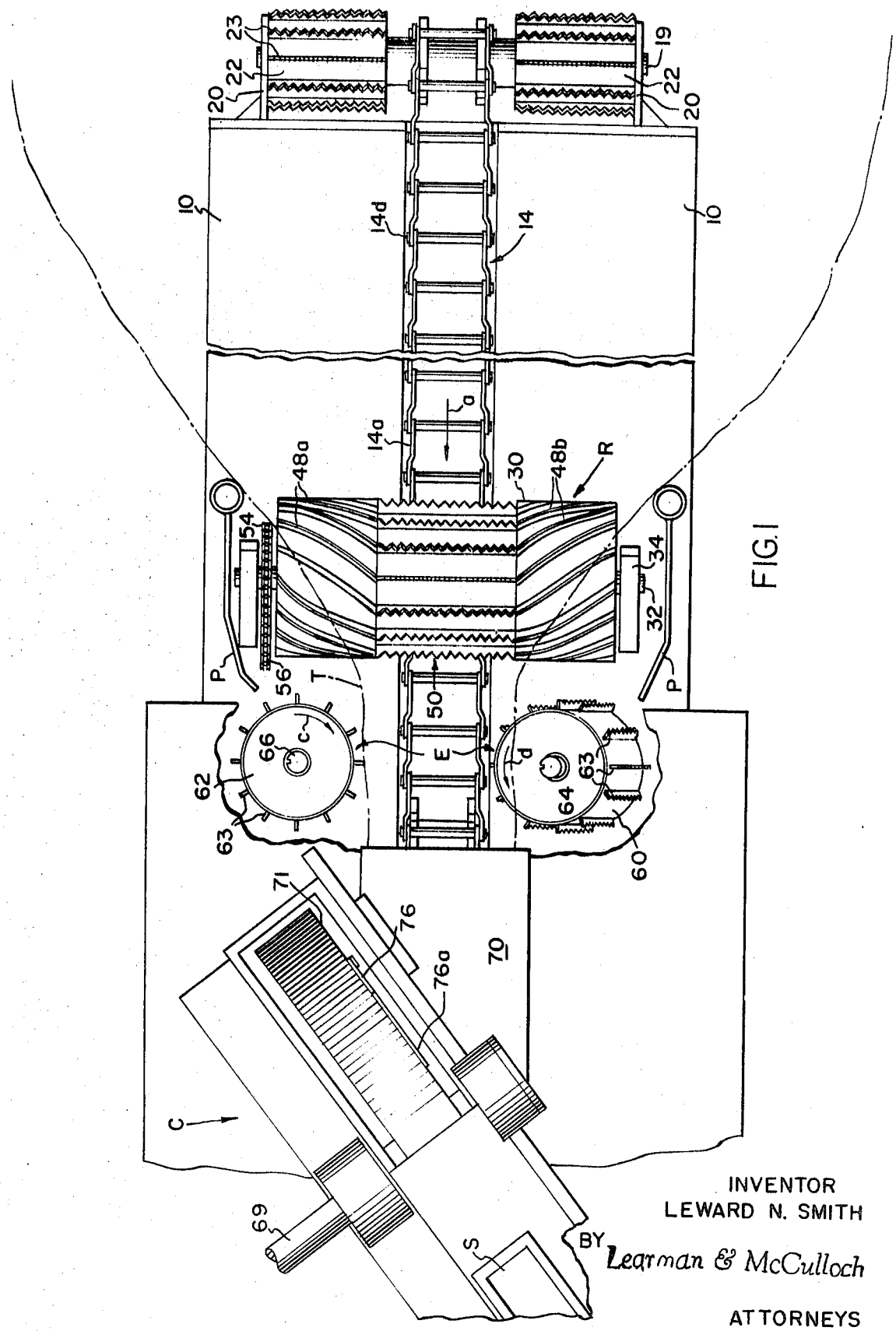
FIG. 1 is a fragmentary, top plan view illustrating apparatus constructed according to the invention, parts being broken away to more clearly illustrate the underlying, upstanding side rolls.

Disposed on opposite sides of the longitudinally extending conveyor 14 is a pair of upstanding rollers E comprising cylindrical drums 60 and 62 fixed on a pair of generally vertical shafts 64 and 66, respectively, which are journaled at opposite ends in suitable frame supported bearings (not shown). The drums 60 and 62 each include a plurality of circumferentially spaced serrated or toothed ribs 63 forming comb-like teeth which are engaged by the tree branches and move them laterally inwardly toward the trunk of the tree being moved toward the chipper C. The output shafts (not shown) of a pair of motors 57 and 59 (FIG. 4) are drivingly connected with shafts 64 and 66, respectively, for independently driving the drums 60 and 62 in opposite directions or rotations as represented by the arrows $c$ and $d$ (FIG. 1). The drums 60 and 62 are spaced apart a distance slightly less than the length of the drum 30 to laterally compress upwardly and laterally extending branches which might otherwise not be pressed toward the trunk and to prevent branches which have been compressed by roller R from springing back, but the distance is slightly greater than the vertical distance between the drum 30 and chain conveyor 14 to permit the tree to swing laterally slightly, if it needs to, about the gripping nip formed by roll R and conveyor D as a fulcrum, into alignment with the chute 70 of the chipper C as the tree is moved forwardly. The upper ends of the drums 60 and 62 extend upwardly beyond the lower surface of roll R when the latter is in operating position and extend downwardly through openings 10a in platform plates 18 to prevent certain laterally and vertically extending branches from passing without being vertically folded toward the trunk. Certain branches which initially were not depressed by roll R are laterally deflected by rolls 60 or 62 and their trailing ends are thus swung over to be vertically compressed by roll R. Thus, in the longitudinal pathway the rolls 60 and 62 may be said to laterally and vertically lap the drive roll R and conveyor D which grip the tree and advance it forwardly. As particularly illustrated in FIG. 3, the left drum 60 is slightly canted so that the apparatus can better accommodate trees of varying sizes.

Disposed on the platforms 10 at opposite ends of the drive roll R is a pair of lateral guide plates P which forwardly converge and extend to a position adjacent the upstanding rolls E to wedge the laterally extreme branches inwardly into engagement with the toothed ribs 63 which will drive them (counterclockwise in FIG. 1) toward the trunk of the tree T.

THE CHIPPING UNIT

The chipping unit C includes a supply chute 70 having a generally rectangular entrance passage of a width substantially equal to the distance between the upstanding rolls 60 and 62 and of a height substantially equal to the distance between the drive roll R and the conveyor chain 14. Outwardly flared guides 70a are provided at the mouth of the chute 70 to guide the tree in its forward path of travel. The drive roll R, conveyor chain 14, and upstanding rolls E define a forwardly converging pathway or funnel for funneling trees into the feed chute 70. The chipper C, as usual, includes a rotatable chipping disc 71 mounted on a drive shaft 69 which is driven by a suitable power source, such as a diesel engine not shown). Chipping knives 76 with generally radial cutting edges 76a are provided on the chipping wheel 71 as usual to reduce the wood to small chips and, in view of the inclination of the disc 71 and edges 76a draw the trunk inwardly or forwardly. A discharge spout (not shown) is provided on the upper end of the chipper and discharge a stream of chips to a container (not shown). Chipping apparatus of the type disclosed in U.S. Pat. No. 3,524,485 issued Aug. 18, 1970, and incorporated herein by reference, is generally suitable for this purpose. The diesel engine which drives the chipper shaft 69 also drives a plurality of external gear pumps 72, 73, 74 and 75 (FIG. 4) for supplying hydraulic fluid, as will later be more particularly described, to the rotary fluid motors 13, 31, 57, and 59, respectively, which drive the conveyor chain 14, the roll R, and the side rolls E. Therefore, the speed of the chipping knives 76 is correlated with the speed of the conveying chain 14, drive roll R, and side rolls 60 and 62, so that the trees are fed into the knives at a rate proportional to the velocity of the knives 76.

THE CONTROL CIRCUIT

The control circuit illustrated in FIG. 4 includes four hydraulic pumps 72, 73, 74, and 75 driven by the diesel engine (not shown), which drives the shaft 69 of the chipping unit C. The hydraulic pumps 72, 73, 74, and 75 are connected in circuit with the reversible hydraulic motors 31, 37, 59 and 13 respectively, and with control valves to be presently described. The hydraulic motors may be of the type manufactured by Char Lynn Company, of Minneapolis, Minnesota, as Model No. 8,000.

Since the control valve and associated circuitry is identical for each pump and associated motor circuit, only the circuit associated with the pump 72 and the motor 31, will be described. The individual circuitry for connecting the pump 73 and the motor 57, for connecting the pump 74 and the motor 59, and for connecting the pump 75 and the motor 13, will be identical to that of the pump 72 and the motor 31, and will be identified with identical numerals having letter subscripts "a," "b" and "c," respectively.

The pump 72 pumps fluid from a reservoir 80 through a line 77 to a pilot operated valve, generally designated 82 including a main valve 94 and a pilot valve 83. The valve 82 may be of the type manufactured by Rivett, Inc. of Pewaukee, Wisconsin, as Model No. 6,656. When the valve 82 is deenergized, fluid flows from line 77 through the main valve 94, to the line 96, and then to the reservoir 95. The pilot valve 83 is connected between a reservoir 84 and the pump 75 by a line 86 which is connected to the input of the pilot valve 83 and a line 87 which is connected to the output line 88 of the pump 75. A relief valve 105 is connected between the line 77 and a reservoir 106 for relieving the pressure in line 77 when it builds to a predetermined value.

The solenoid 89, for moving the spool of pilot valve 83 to the "flow-through" position is connected with a D.C. battery 90 by conductor 104 and a three-position switch 91, illustrated in the "off" position in FIG. 4 and including sets of switch contacts 92 and 100 and a switch arm 91a. When the switch arm 91a is moved into engagement with the switch contacts 92, the solenoid 89 is energized to move the pilot valve 83 to the "flow-through" position so that hydraulic fluid will flow from the line 86 through the line 93 to move the spool of the main valve 94 to the "flow-through" position so that fluid will flow from line 77, to line 103, through the hydraulic motor 31, in the direction represented by the arrow $b$, the line 102 and then to the reservoir 95 through the line 96. The solenoid 98 on the pilot valve 83 is connected via circuit line 99 across the battery 90 through the other set of contacts 100 of the switch 91. When the switch arm 91a connects the switch contacts 100, the solenoid 98 is operable to move the pilot valve 83 to the "cross-over" position so that hydraulic fluid flows from line 86 through the line 101 to move the main valve 94 to the "cross-over" position so that fluid from the pump 72 passes through line 77, line 102 to the motor 31, in a direction opposite the arrow $b$, to drive the motor 31 in the opposite direction, and thence to the line 103, the line 96 and the reservoir 95. By selectively moving the switch arm 91a into engagement with the contacts 100 and 92, the fluid motors 31, 57, 59 and 13, can be selectively, simultaneously driven in a forward direction to move the trees forwardly in the direction of the arrow a (FIG. 1) or in the opposite direction to move the trees out of the chipper unit C.

THE OPERATION

The tree destroying apparatus constructed according to the present invention is generally mounted on a mobile frame F which is movable to a site where felled trees are located. A boom (not shown) having tree gripping claws may be mounted either separately, or on the trailer frame F, and is operable to grip and deposit a whole tree, butt end first, on the "live deck" D. In the first place the operator will have manually moved the switch arm 91a into engagement with the contacts 92 to energize the solenoid 89c and permit the fluid motor 13 to be driven so that the conveyor chain 14 moves the tree forwardly, butt first, toward the chipper C. When the contacts 92 are closed, the solenoid 89 is also energized so that fluid is permitted to pass to the drive roll driving motor 31 to drive the roll R. The switch arm 91a is actuated before trees are deposited and remains activated during normal operation of the machine. The trees are fed forwardly into engagement with the teeth on the drive roll R, which forces the tree tightly into engagement with the conveyor 14 as it is propelled forwardly. The roll R grips the tree and forces it against the conveyor 14 such that the tree T is gripped and cooperatively driven in a positive manner to the chipper C. The drive roll R operates to crush the vertical limbs toward the trunk of the tree. When the switch contacts 92 were closed, the solenoids 89a and 89b were also energized to direct fluid to the upstanding roll driving motors 37 and 59. After the tree passes forwardly of the upper roller R, the upstanding rolls 60 and 62 engage the limbs on laterally opposite sides of the tree to crush them laterally inwardly toward the tree trunk in addition to propelling them forwardly in the direction of the arrow a. As the tree is fed forwardly, the flared guide portion 70a centrally deflect or swing the tree trunk about the fulcrum formed by the upper roll R and conveyor chain 14. The tree is fed into the chipper chute 70 and against the chipping wheel 71 to be reduced to chips. Because the tree being destroyed is free to swing about the fulcrum formed by the upper roller R and conveyor chain 14, a crooked tree being destroyed is permitted to pass through the chute 70 by swinging vertically and laterally about the fulcrum as it is driven forwardly. The rolls R and E, and chain 14 are each driven at a rate of speed to propel the tree forwardly at a faster rate than knives 76 operate to draw the tree inwardly so that the tree is crammed into chipper C. When the rough, leafy type foliage of trees and brush is being destroyed there is insufficient material for the cutting edges 76a to grip and thus the chipper disc 71 will not effectively draw the foliage into the chipper disc. Hence, it is important that the side rolls 60 and 62 are power driven to aid in feeding the foliage toward the disc 71. Also because the same drive which operates shaft 69 is used to drive hydraulic pumps 72 – 75 any slow down of chipper 76 will result in a slow up of feed rate. In the event of a binding jam up, the switch arm 91a is moved into engagement with the contacts 100 and the roll R, the side rolls E, and the conveyor 14 are driven in an opposite direction to back off the tree. It should be noted that if one of the rolls E, upper roll R or conveyor chain 14 is temporarily prevented from rotating because it catches on a knot or some other protrusion on the tree, the unblocked elements will continue to operate to move the tree because each is independently driven. The cylinder 42 can be actuated to selectively raise or lower the drive roll R to accommodate trees of varying sizes.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. Tree destroying apparatus for reducing a felled tree, having attached limbs and branches, to chips comprising:
    a longitudinally extending frame having front and rear ends;
    chipping means thereon for chipping said tree into chips at a chipping station having a generally rearward facing entrance opening for passing trees thereto trunk-first;
    means on said frame for feeding said tree in a longitudinal path of travel toward said chipping means including;
    a generally horizontal, tree supporting feed bed including power driven, longitudinally extending conveyor means;
    a generally laterally extending, endlessly driven member having tree engaging surfaces supported above said feed bed and cooperating with said conveyor means to form a tree feeding drive nip rearwardly of said entrance opening for securely gripping vertically opposite sides of a tree positioned on the feed bed to crush branches vertically toward the tree trunk and to move the tree forwardly toward said chipping means;
    means on said frame supporting said member for endless travel;
    upstanding, laterally spaced, limb and and branch folding members positioned on opposite sides of said conveying means for engaging the branches on opposite sides of a tree supported on said feed bed and folding the tree branches laterally toward the tree trunk, said upstanding branch folding members having tree engaging surfaces positioned laterally inwardly of the lateral sides of said member to insure that laterally extending branches are folded inwardly toward the tree trunk and can enter said entrance opening; and
    drive means on said frame for driving said member and conveying means at coordinated tree feeding speeds.

2. The apparatus as set forth in claim 1 wherein said laterally extending, endlessly driven member comprises at least one roll having endlessly driven, tree-engaging surfaces.

3. The apparatus as set forth in claim 1 in which directing means is provided on one of said conveyor means or member for moving a tree toward centered position on said feed bed.

4. The apparatus as set forth in claim 3 in which said laterally extending member comprises a roll and directing means for moving a tree toward centered position on said feed bed is provided thereon.

5. The apparatus as set forth in claim 4 in which said directing means comprises first and second oppositely pitched flights on opposite ends of said roll.

6. The apparatus as set forth in claim 5 in which said roll includes a midsection between said first and second flights having a plurality of circumferentially spaced rows of comb-like teeth.

7. The apparatus as set forth in claim 1 wherein said feed bed includes tree support surfaces inclined upwardly and outwardly from opposite lateral sides of said conveyor means directly below said member.

8. The apparatus as set forth in claim 1 in which generally laterally extending, endlessly driven rear members are mounted rearwardly of said endlessly driven member on opposite sides of said feed bed; and means is provided for driving said rear members.

9. The apparatus as set forth in claim 8 in which said rear members comprise laterally extending rolls having circumferentially spaced branch engaging, comb-like teeth thereon.

10. The apparatus as set forth in claim 1 wherein said conveyor means comprises an endless drag chain comprising side links connected by longitudinally spaced cross members.

11. The apparatus as set forth in claim 10 in which said member comprises a roll extending laterally beyond the lateral sides of said chain and above upwardly and laterally outwardly inclined side support surfaces extending laterally outwardly relative to said chain.

12. The apparatus as set forth in claim 11 in which comb-like teeth are provided on said roll directly above said chain.

13. The apparatus as set forth in claim 12 in which tree directing members of opposite hand, to direct branches laterally inwardly, are provided on the roll above said inclined surfaces.

14. The apparatus as set forth in claim 1 in which means mounts said member for vertical travel.

15. The apparatus as set forth in claim 14 in which said means mounting the member for vertical travel mounts it for upward and downward swinging movement about a generally horizontal axis disposed a spaced distance forwardly of said member.

16. The apparatus as set forth in claim 15 in which means is provided for yieldably urging said member toward said feed bed.

17. The apparatus as set forth in claim 15 in which downwardly and forwardly inclined deflector plate means is mounted for upward and downward travel with said member.

18. The apparatus as set forth in claim 1 in which said chipping means includes a rotatable chipping disc having chipping teeth thereon, and a housing for said disc having a longitudinally extending chute, forming said entrance opening and having its bottom in general alignment with said conveyor means.

19. The apparatus as set forth in claim 18 in which said disc is angularly disposed to the longitudinal extent of said conveyor means and path of travel of the tree.

20. The apparatus as set forth in claim 1 wherein said laterally spaced limb and branch folding members comprise generally vertically disposed power driven rolls; and means for driving said rolls at a coordinated tree feeding speed with said member and conveying means.

21. The apparatus as set forth in claim 20 in which comb-like teeth are provided on said generally vertically disposed rolls.

22. The apparatus as set forth in claim 21 in which said teeth are provided in circumferentially spaced, generally linear rows.

23. The apparatus as set forth in claim 20 in which at least one of said generally vertically disposed rolls is inclined upwardly and laterally inwardly.

24. The apparatus as set forth in claim 20 in which said generally vertically spaced rolls are spaced longitudinally forwardly of the front portion of said member adjacent to and generally laterally framing said entrance opening.

25. The apparatus as set forth in claim 24 in which laterally inwardly and forwardly convergent guide plates are fixed on said frame laterally outboard of said member, and extend from points opposite the ends of said member forwardly toward said generally vertically disposed rollers.

26. The apparatus set forth in claim 20 in which reversible drive means is provided for selectively driving said conveyor means, member and generally vertically disposed rolls.

27. The apparatus set forth in claim 20 in which said reversible drive means comprises individual hydraulic rotary motors for said member and generally vertically disposed rolls.

28. The apparatus as set forth in claim 20 in which said feed bed includes tree support surfaces inclined upwardly and laterally outwardly from opposite lateral sides of said conveyor means; and said generally vertically disposed rolls extend upwardly from said support surfaces to a level above said member.

29. The apparatus as set forth in claim 20 wherein said member comprises a top roll having a diameter considerably greater than the diameter of said generally vertically extending rolls.

30. Tree destroying apparatus for reducing a felled tree, having attached limbs and branches, to chips comprising:
a longitudinally extending frame having front and rear ends;
chipping means thereon for chipping said tree into chips at a chipping station having a generally rearward facing entrance opening for passing trees thereto trunk-first;
means on said frame for feeding said tree in a longitudinal path of travel toward said chipping means including:
a generally horizontal, tree supporting feed bed including power driven, longitudinally extending conveyor means;
a generally laterally extending power driven roll having tree-engaging surfaces supported above said feed bed and cooperating with said conveyor means to form a tree feeding drive nip rearwardly of said entrance opening for securely gripping vertically opposite sides of a tree positioned on the feed bed to crush branches vertically toward the tree trunk and to move the tree forwardly toward said chipping means;
means on said frame supporting said roll for rotation;
upstanding, laterally spaced, power driven rollers spaced longitudinally from said roll and positioned on opposite sides of said conveyor means for engaging the branches on opposite sides of a tree supported on said feed bed and folding the tree branches laterally toward the tree trunk, said upstanding rollers having tree engaging surfaces positioned laterally inwardly of the ends of said drive roll to insure that certain compositely vertically and laterally extending branches are also folded inwardly toward the tree trunk; and
drive means for driving said conveyor means, roll, and rollers at coordinated tree feeding speeds.

31. The tree destroying apparatus of claim 30 wherein said laterally extending roll includes first and second oppositely pitched flights on opposite ends thereof for moving said branches on laterally opposite sides of said tree trunk inwardly toward said trunk.

32. The tree destroying apparatus set forth in claim 31 wherein said roll includes a midsection between said first and second oppositely pitched flights including a plurality of circumferentially spaced rows of teeth to maintain the branches centered between said oppositely pitched flights and to propel the tree forwardly toward said chipping means.

33. The tree destroying apparatus set forth in claim 30 wherein said feed bed includes tree support surfaces inclined downwardly inwardly from opposite lateral sides thereof toward said conveyor means; and further including additional feed rolls at the rear of said horizontal feed bed for gathering the branches toward the trunk as the tree is moved forwardly along said tree support surfaces toward said chipping means.

34. Tree destroying apparatus for reducing a felled tree, having attached limbs and branches, to chips comprising:
a longitudinally extending frame having front and rear ends;
chipping means thereon for chipping said tree into chips at a chipping station having a generally rearward facing entrance opening for passing trees thereto trunk-first;
means on said frame for feeding said tree in a longitudinal path of travel toward said chipping means including:
a generally horizontal, tree supporting feed bed including power driven, longitudinally extending conveyor means;
a generally laterally extending endlessly driven member having tree engaging surface supported above said feed bed and cooperating with said conveyor means to form a tree feeding drive nip rearwardly of said entrance opening for securely gripping vertically opposite sides of a tree positioned on the feed bed to crush branches vertically toward the tree trunk and to move the tree forwardly toward said chipping means;
means on said frame supporting said member for endless travel;
upstanding, laterally spaced, limb and branch folding members positioned on opposite sides of said conveying means for engaging the branches on opposite sides of a tree supported on said feed bed and folding the tree branches laterally toward the tree trunk;
directing means on one of said conveyor means and member for moving a tree toward centered position on said feed bed; and
drive means on said frame for driving said member and conveying means at coordinated tree feeding speeds.

35. The apparatus as set forth in claim 34 in which said laterally extending member comprises a roll and said directing means is provided thereon.

36. The apparatus as set forth in claim 35 in which said directing means comprises first and second oppositely pitched flights on opposite ends of said roll.

37. The apparatus as set forth in claim 36 in which said roll includes a midsection between said first and second flights having a plurality of circumferentially spaced comb-like teeth.

38. The apparatus as set forth in claim 35 wherein said feed bed includes tree support surfaces inclined upwardly and outwardly from opposite lateral sides of said conveyor means directly below the flights on said member.

39. Tree destroying apparatus for reducing a felled tree, having attached limbs and branches, to chips comprising:
 a longitudinally extending frame having front and rear ends;
 chipping means thereon for chipping said tree into chips at a chipping station having a generally rearward facing entrance opening for passing trees thereto trunk-first;
 means on said frame for feeding said tree in a longitudinal path of travel toward said chipping means including;
 a generally horizontal, tree supporting feed bed including power driven, longitudinally extending conveyor means;
 a generally laterally extending endlessly driven member having tree engaging surfaces supported above said feed bed and cooperating with said conveyor means to form a tree feeding drive nip rearwardly of said entrance opening for securely gripping vertically opposite sides of a tree positioned on the feed bed to crush branches vertically toward the tree trunk and to move the tree forwardly toward said chipping means;
 means on said frame supporting said member for endless travel;
 upstanding laterally spaced limb and branch folding members positioned on opposite sides of said conveying means for engaging the branches on opposite sides of a tree supported on said feed bed and folding the tree branches laterally toward the tree trunk; and
 generally laterally extending power driven endless sections mounted on said frame rearward of said member on opposite lateral sides of said conveyor means; and
 drive means on said frame for driving said member, said sections, and conveying means at coordinated tree feeding speeds.

40. Tree destroying apparatus for reducing a felled tree, having attached limbs and branches, to chips comprising:
 a longitudinally extending frame having front and rear ends;
 chipping disc means thereon for chipping said tree into chips at a chipping station having a generally rearward facing entrance opening for passing trees thereto trunk-first;
 means on said frame for feeding said tree in a longitudinal path of travel toward said chipping means including;
 a generally horizontal, tree supporting feed bed including power driven, longitudinally extending conveyor means;
 a generally laterally extending endlessly driven roll member having tree engaging surfaces supported above said feed bed and cooperating with said conveyor means to form a tree feeding drive nip spaced rearwardly of said entrance opening for securely gripping vertically opposite sides of a tree position on the feed bed to crush branches vertically toward the tree trunk and to move the tree forwardly toward said chipping means;
 means on said frame supporting said roll member for endless travel;
 upstanding, laterally spaced, power driven limb and branch folding roll members positioned on opposite sides of said conveying means for engaging the branches on opposite sides of a tree supported on said feed bed and folding the tree branches laterally toward the tree trunk, said upstanding roll members having circumferentially spaced comb-like teeth thereon for engaging the tree branches upstream from said laterally extending roll member to insure that laterally extending branches are folded inwardly toward the tree trunk and can enter said entrance opening; and
 drive means on said frame for driving said laterally extending roll member, said upstanding roll members, and conveying means at coordinated tree feeding speeds.

41. Tree destroying apparatus for reducing a felled tree, having attached limbs and branches, to chips comprising:
 a longitudinally extending frame having front and rear ends;
 chipping means comprising a rotatably mounted disc with chipping cutters thereon for chipping said tree into chips at a chipping station having a generally rearward facing entrance opening for passing trees thereto trunk-first, the disc and cutter being operative to draw the tree inwardly through said opening as the disc rotates;
 drive means on said frame for rotating said chipping disc at a speed to draw the tree inwardly at a predetermined speed;
 means on said frame for feeding said tree in a longitudinal path of travel toward said chipping means including;
 a generally horizontal, tree supporting feed bed including power driven, longitudinally extending conveyor means;
 a generally laterally extending, endlessly driven roll member having tree engaging surfaces supported above said feed bed and cooperating with said conveyor means to form a tree feeding drive nip rearwardly of said entrance opening for securely gripping vertically opposite sides of a tree positioned on the feed bed to crush branches vertically toward the tree trunk and to move the tree forwardly toward said chipping means;
 means on said frame supporting said roll member for endless travel;
 upstanding, laterally spaced, power driven limb and branch folding roll members positioned on opposite sides of said conveying means for engaging the branches on opposite sides of a tree supported on said feed bed and folding the tree branches laterally toward the tree trunk to insure that they can enter said entrance opening; and
 reversible drive means on said frame for driving said laterally extending roll member, said upstanding roll members, and conveying means at coordinated tree feeding speeds which propel the tree faster than the speed at which the disc and cutters draw the tree inwardly.

42. The tree destroying apparatus set forth in claim 41 wherein said laterally extending roll is mounted for pivotal movement about a horizontal axis disposed a spaced distance forwardly of said roll to clear the area rearward of the roll and minimize the possibility of the branches becoming entangled with the roll support.

43. The tree destroying apparatus set forth in claim 40 including reversible drive means for selectively driving said longitudinally extending conveyor means, said power driven drive roll, and said upstanding rollers in opposite directions to selectively feed trees toward or away from said chipping means.

44. The tree destroying apparatus set forth in claim 43 wherein said drive means includes individual motor means for individually driving each of said conveyor means, said drive roll, and said upstanding rollers.

* * * * *

Disclaimer 3,661,333.—*Leward N. Smith*, Remus, Mich. TREE DESTROYER. Patent dated May 9, 1972. Disclaimer filed Mar. 24, 1976, by the assignee, *Morbark Industries, Inc.*

Hereby enters this disclaimer to claims 1–3, 7–12, 14–16, 18, 19, 34, 35, 38 and 39 of said patent.

[*Official Gazette May 25, 1976.*]

UNITED STATES PATENT OFFICE
CERTIFICATE OF CORRECTION

PATENT NO. : 3,661,333
DATED : May 9, 1972
INVENTOR(S) : Leward N. Smith

It is certified that error appears in the above-identified patent and that said Letters Patent are hereby corrected as shown below:

Column 7, line 44, "spaced" first occurrence should be -- disposed --.

Column 10, line 6, "upstream" should be -- downstream --.

Signed and Sealed this

Twenty-fifth Day of January 1977

[SEAL]

Attest:

RUTH C. MASON
*Attesting Officer*

C. MARSHALL DANN
*Commissioner of Patents and Trademarks*